2 Sheets--Sheet 2.
J. C. CHAPMAN.
Machine for Boring Cylinders.
No. 162,458. Patented April 27, 1875.
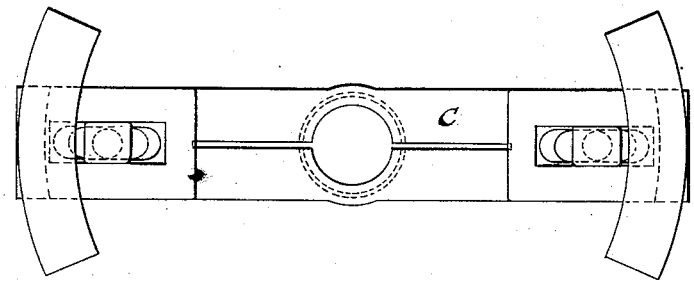
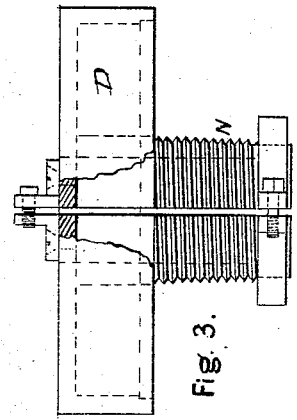
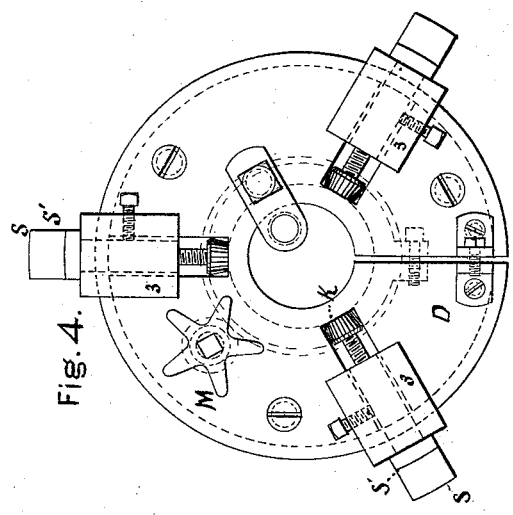
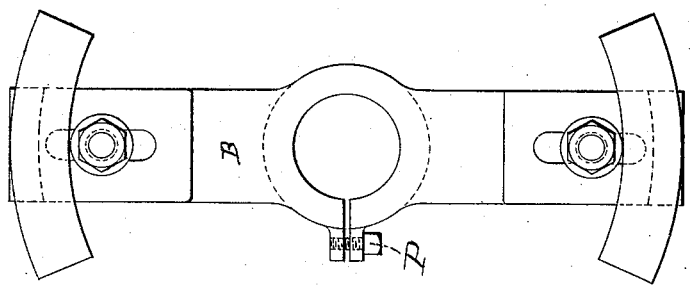
WITNESSES.
John C. Chapman
by his Atty
A. N. Evans & Co.
INVENTOR.

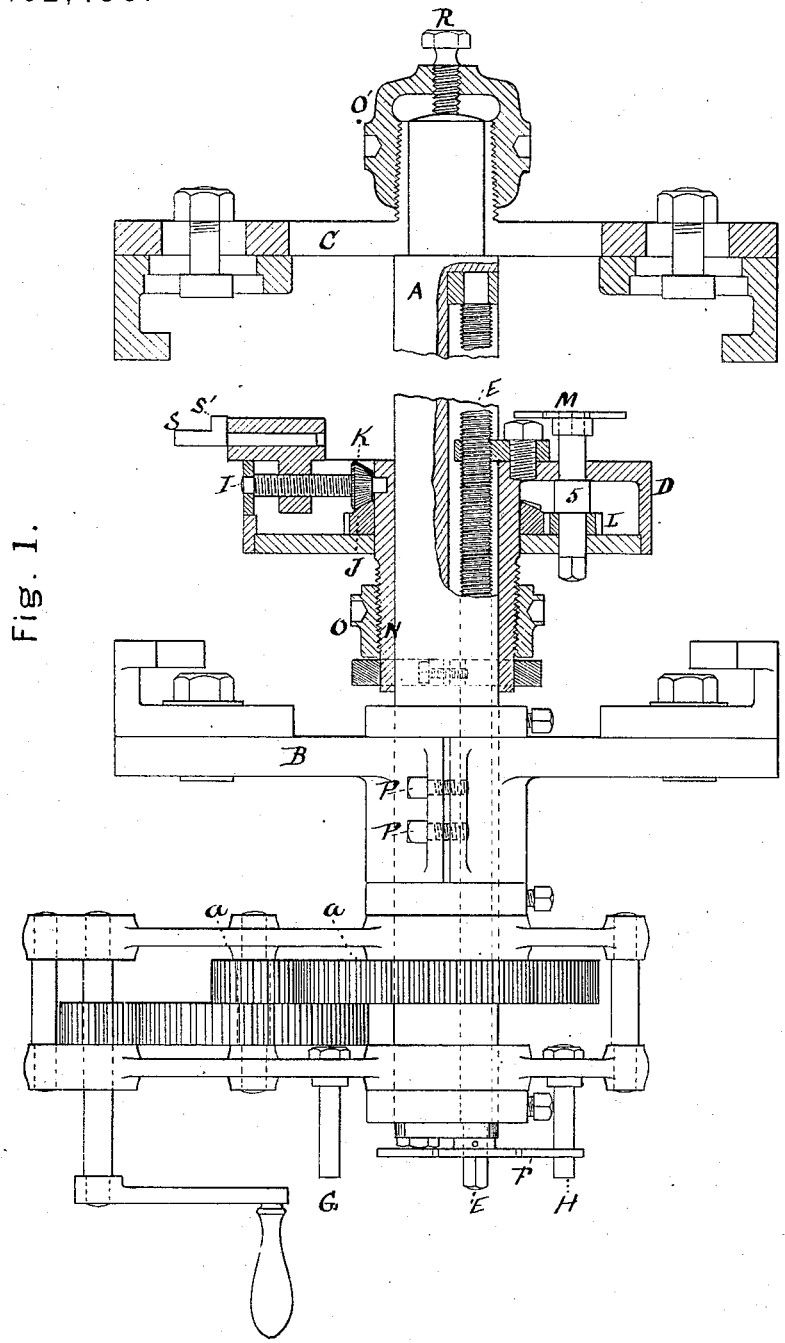

UNITED STATES PATENT OFFICE.

JOHN C. CHAPMAN, OF PASSAIC, NEW JERSEY.

IMPROVEMENT IN MACHINES FOR BORING CYLINDERS.

Specification forming part of Letters Patent No. 162,458, dated April 27, 1875; application filed September 14, 1874.

*To all whom it may concern:*

Be it known that I, JOHN C. CHAPMAN, of Passaic, in the county of Passaic and State of New Jersey, have invented certain new and useful Improvements in Boring-Bars, of which the following is a full, clear, and exact description, reference being had to the accompanying drawings making a part of this specification, in which—

Figure 1 is a side elevation of the boring-bar, part in section. Fig. 2 is an elevation of the bearing-pieces for the bar nearest the power end. Fig. 3 is a sectional plan of the boring-head. Fig. 4 is a front elevation of the head. Fig. 5 is an elevation of the bearing-piece for the bar.

This invention relates to certain improvements in boring-machines, by means of which the work of boring may be much more accurately done than formerly. These improvements also provide a means of facing up and turning the flanges of cylinders with the same bar and head as used in boring, and also with this arrangement the boring-bar may be adjusted to its work with greater facility, thus saving much valuable time over tne ordinary way. The principle improvement which I claim for this machine is, the combination of devices for taking up any looseness or lost motion in the several parts, and also for operating the tools in facing up the cylinder-flanges.

In order that those skilled in the art may make and use my invention I will proceed to describe the exact manner in which I have carried it out.

The boring-bar A is supported in bearings at each end of the cylinder, as at B and C, and the boring-head D is nicely fitted to slide on the bar A, and is moved along said bar A, in either direction, by means of the feeding-screw E. This feeding-screw E is operated by the star-wheel F, which is secured to said screw E. The star-wheel F comes in contact with the stops G and H, as the bar A revolves, thus causing the screw E to be turned partly around as it engages with either of the said stops G and H. The boring-head D may be moved along the bar A, either way, with a quick motion, by applying a crank directly to the screw E, and revolving it as desired. The boring-head D has three tool-holders or sockets, 3 3 3, secured to it and placed at equal distances around its circumference. These sockets have fitted to them different kinds of tools, according to the work to be done, and also pieces fitted to the sockets and turned off concentric with the bar on which the head slides, as shown at S. These tool-holders in the boring-head are moved out or in by means of the screws I running through them, having their outer ends fixed and bearing a bevel-pinion, K, at their lower ends, meshing into a bevel-gear, J, which is operated by the spur-pinion L on the shaft 5. The shaft 5 runs entirely through the head, so that the star-wheel M may be applied to either end. The boring-head D has a long bearing on the boring-bar A, and has, also, a slot cut on one side of the hub, and extending through its entire length and out through the circumference of the head. Part of the hub N is turned conical and is slotted, as shown. It has a nut, O, fitted to it, and as this nut O is screwed up on the cone it reduces the diameter of the hub, and makes it fit closely on the bar A, and thus prevents any vibration of the head D on said bar A. The bearing C is slotted, as shown in Fig. 5, and fitted with the conical nut O', as shown in Fig. 1, and the nut and slot there shown are for the purpose of closing the bearing onto the bar A, and prevents any vibration or chattering. The bearing B is cut through only on one side, and has ears and binding-screws P P, as shown in Figs. 1 and 2. This arrangement is also to close the bearing B onto the bar A, for the purpose above mentioned. The set-screw R, in the end of the nut O', is to take up any lost motion in the direction of the length of the bar A. The power for revolving the bar is applied through the shaft and gears, as usual, shown at *a a a*.

In using this machine it is adjusted and operated as follows: The head D is introduced into one end of the cylinder to be bored, and the pieces S moved out until the shoulders S' meet the inside surface of the cylinder, which operation will bring the bar A correctly in the center of said cylinder. At the same time the portion of the piece S above the shoulder S' should rest against the face of the cylinder-flange, and as these pieces are all in a plane at right angles with the axis of the bar A, said bar will line correctly with the axis of the cylinder. When this has been done the bearing or spider B is secured in its place to the cylinder, the pieces S are removed and replaced by cutting-tools, and the head D moved to the other end of the same, and the other bearing or spider C adjusted, secured, and centered, as the first. The machine is then ready for work. It will be noticed that the spiders or bearings B and C are secured to the back side of the cylinder-flanges, thus leaving unobstructed the faces of said flanges, which faces may be faced off with the proper tool introduced into the sockets before mentioned. The outer surface of the cylinder-flanges may also be turned off by this arrangement by means of a crooked tool properly applied.

The general features of this machine are covered by a former patent granted to me January 13, 1863, and the parts I claim herein as my invention are improvements on my previous machine, patented as above. My machine is particularly useful in re-boring engine-cylinders without removing them from their places. When one of the cylinder-heads is cast in, the stuffing-box for the piston-rod may be bushed and thus make a bearing for one end of the boring-bar. As improved I hold my machine to be the most convenient and accurate in use.

Having thus described my invention, what I claim as new, and desire to secure by Letters Patent, is—

1. The boring-head D, having a slotted tapering hub and slotted face, in combination with the nut O, as described, for the purpose set forth.

2. The set-screw R and cap or nut O', in combination with the bearing C, and bar A, all constructed and operated as described, for the purpose of taking up any longitudinal motion of the bar and head, as set forth.

3. The pinion L and spur-wheel M, in combination with the gear J, pinion K, screw I, tool-holders 3, and pieces S, all constructed and operated substantially as and for the purpose set forth.

4. The bearing C, constructed as described, in combination with conical nut O' and set-screw R, substantially as and for the purpose set forth.

JOHN C. CHAPMAN.

Witnesses:
 JERH. LODER,
 JOHN FARRELL.